June 30, 1964    J. R. URSCHEL ETAL    3,139,127
MACHINE FOR SLICING A FOOD PRODUCT
Filed Dec. 3, 1959    5 Sheets-Sheet 1
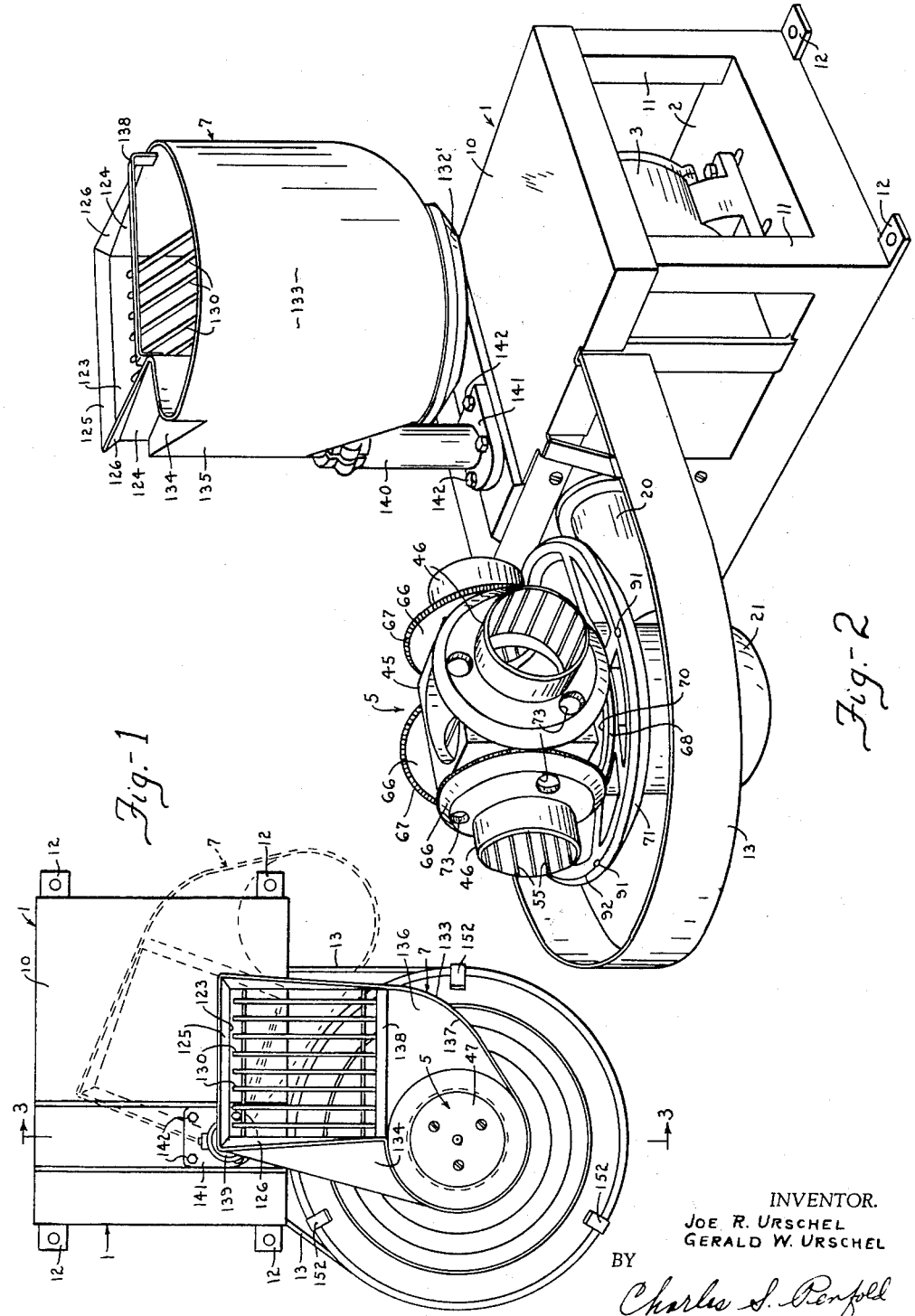
INVENTOR.
JOE R. URSCHEL
GERALD W. URSCHEL
BY
Charles S. Penfold
ATTORNEY

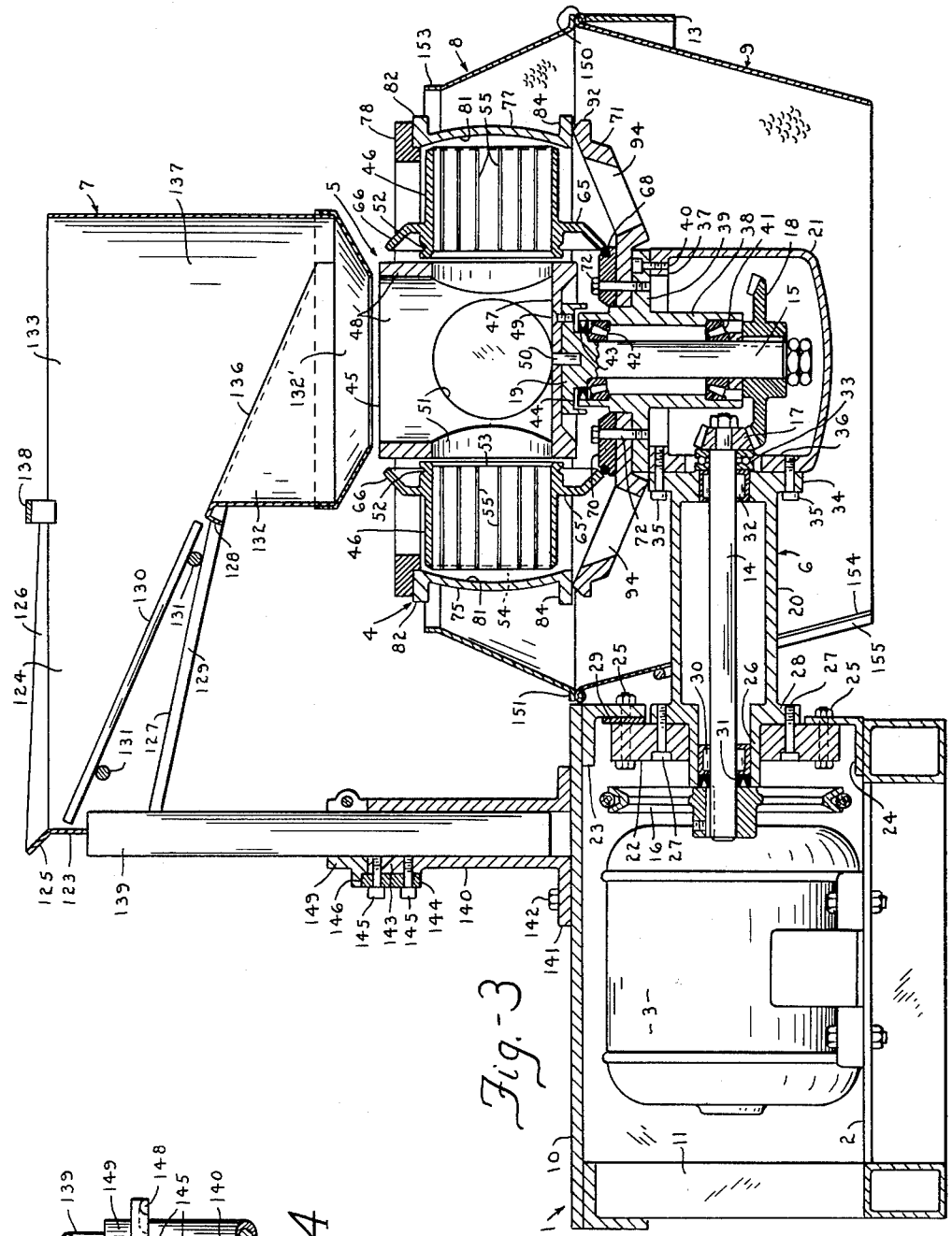

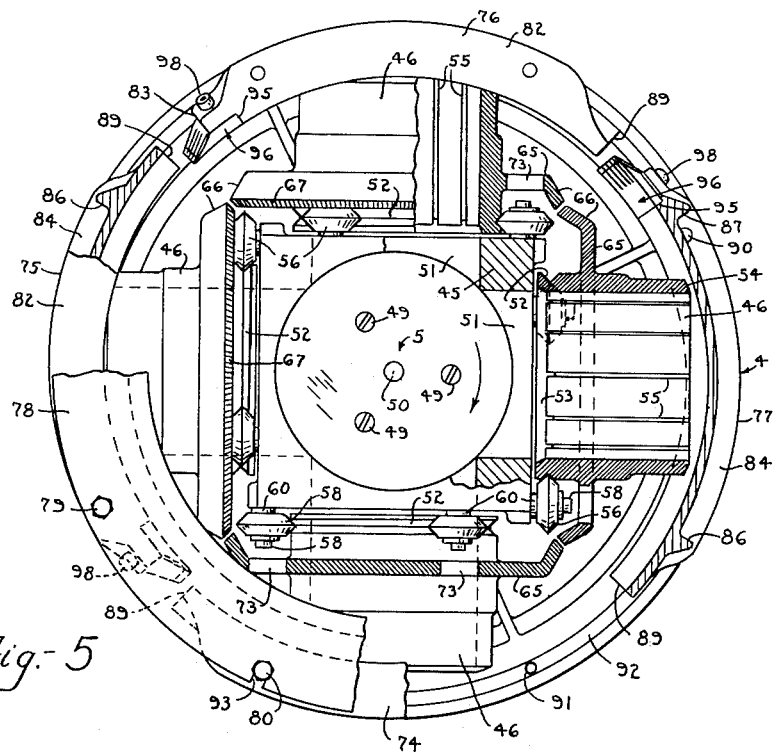
Fig.-5
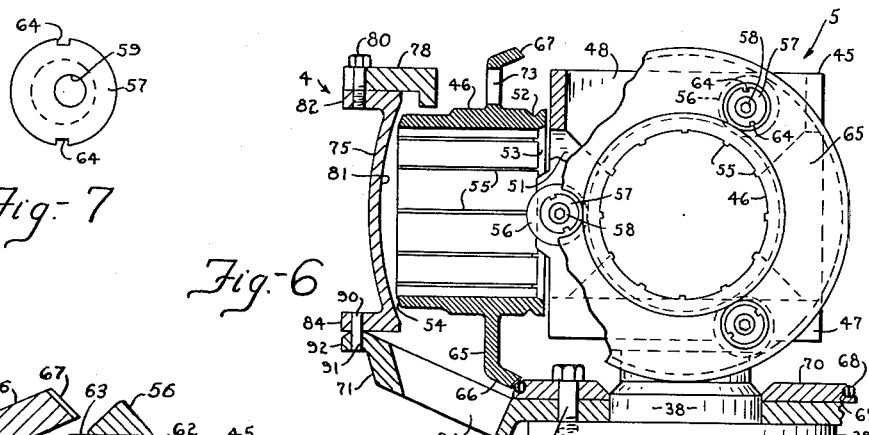
Fig.-7
Fig.-6
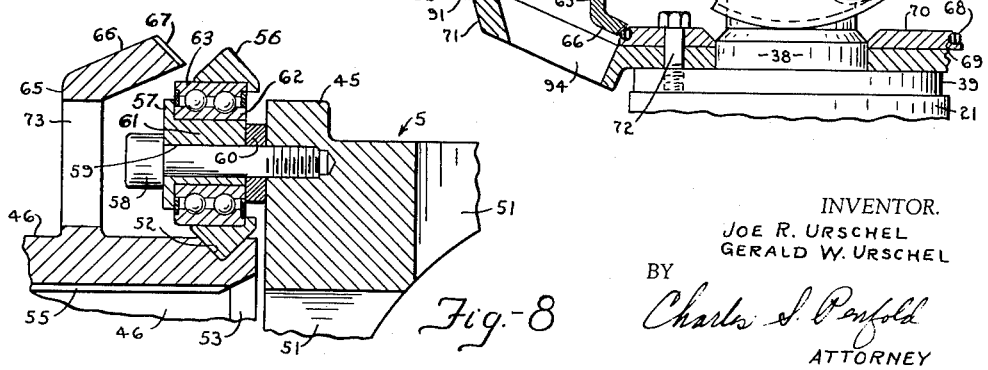
Fig.-8
INVENTOR.
JOE R. URSCHEL
GERALD W. URSCHEL
BY Charles S. Penfold
ATTORNEY June 30, 1964  J. R. URSCHEL ETAL  3,139,127
MACHINE FOR SLICING A FOOD PRODUCT
Filed Dec. 3, 1959  5 Sheets-Sheet 4
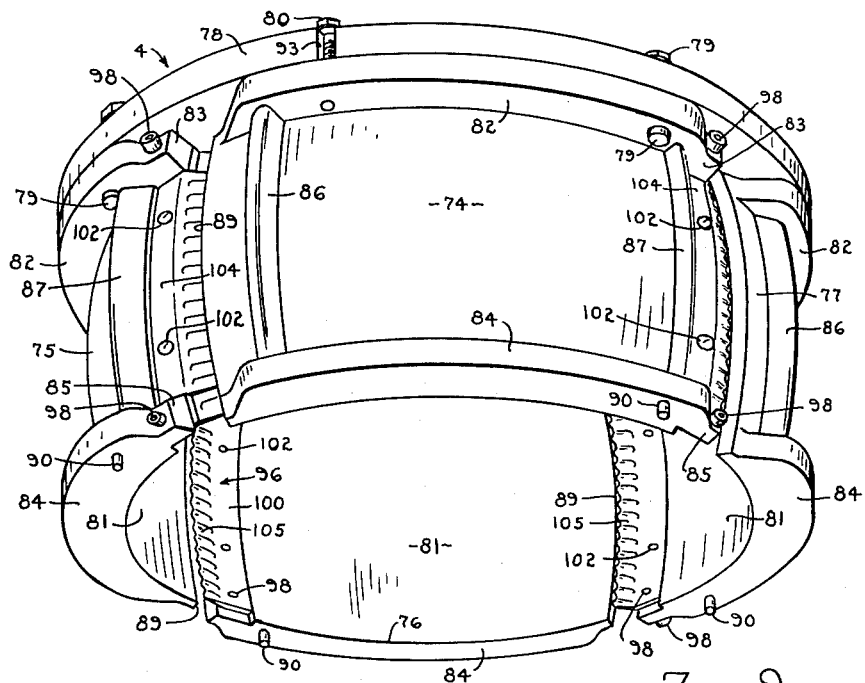
Fig.-9
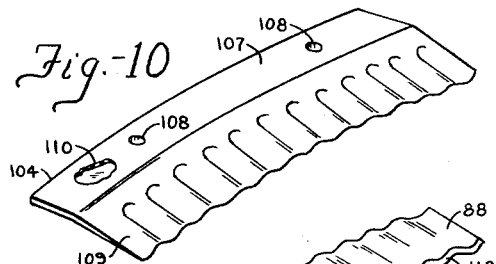
Fig.-10
Fig.-11
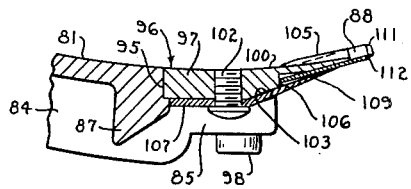
Fig.-13
Fig.-14
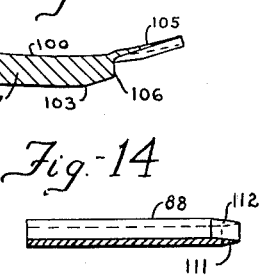
Fig.-15
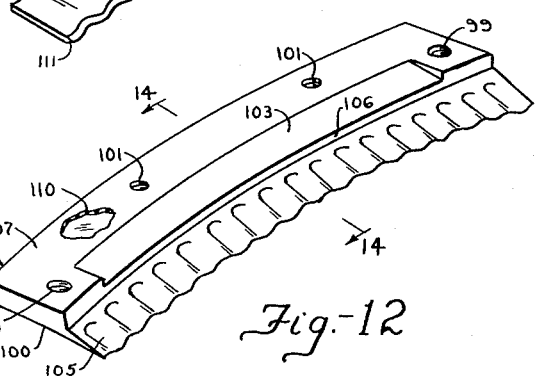
Fig.-12
INVENTOR.
JOE R. URSCHEL
GERALD W. URSCHEL
BY
Charles S. Penfold
ATTORNEY

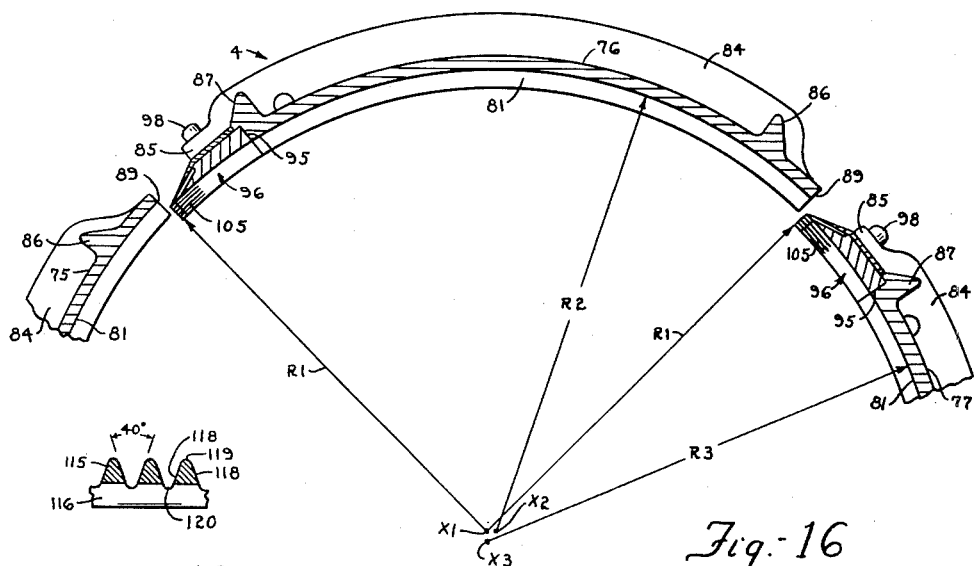
Fig.-16
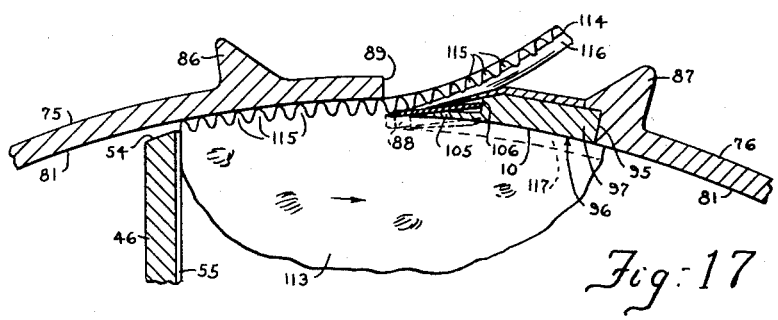
Fig.-17
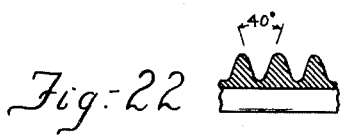
Fig.-19
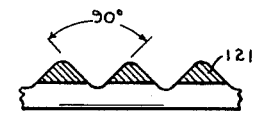
Fig.-22
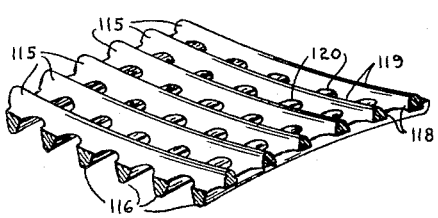
Fig.-18
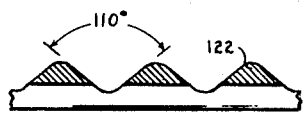
Fig.-20
Fig.-21
INVENTOR.
JOE R. URSCHEL
GERALD W. URSCHEL
BY
Charles S. Parfold
ATTORNEY United States Patent Office 3,139,127
Patented June 30, 1964

3,139,127
MACHINE FOR SLICING A FOOD PRODUCT
Joe R. Urschel, 202 Michigan Ave., and Gerald W. Urschel, 1614 Napoleon, both of Valparaiso, Ind.
Filed Dec. 3, 1959, Ser. No. 856,977
22 Claims. (Cl. 146—78)

The invention relates generally to a machine for cutting a product into pieces and more particularly is directed to a machine for cutting a food product, such as potatoes, into slices or chips of the lattice type.

The demand for chips of the above character has been considerable because of their ornamental appearance and other advantages when fried, but the supply has not been commensurate with the demand. This situation is primarily due to the fact that the majority of machines for manufacturing such chips are inefficient and lack sufficient capacity to expeditiously produce vast quantities on a production basis.

With the foregoing in mind, one of the principal objects of the subject invention is to provide a machine which offers advantages over now existing machines, with respect to operation, efficiency and durability.

An important object of the invention is to provide a machine which includes, among other things, a cutter assembly and a carriage or conveyor assembly which are operatively associated in a unique manner whereby the product is initially fed to the center of the assemblies and then rotated as it is directed radially outward by the carriage to the cutter assembly which surrounds the carriage.

More particularly, an object of the subject invention is to provide a carriage which, among other things, comprises a rotatable receptacle and a plurality of tubular guides journalled on the receptacle so that the product as received by the receptacle will be rotated to direct it outwardly by centrifugal force into the guides which simultaneously rotate and radially channel or distribute the product to the cutter assembly.

A significant object of the invention is to provide a cutter assembly which, among other things, comprises a plurality of corresponding curved segments which are annularly arranged and provided with inner spheroidally shaped bearing or gauging surfaces of appreciable circumferential extent or area on which the product rotatably slides into knives respectively carried by the segments.

Also, an object of the invention is to provide a novel driving mechanism for the carriage and a unique manner of mounting the tubular guides thereon for rotation about their respective axes while the carriage is rotating about its axis.

Another object of the invention is to provide a unique setup for adjustably connecting the tubular guides to the receptacle and to means assisting to rotate or drive the guides.

A particular object of the invention is to provide an improved method of cutting a product which comprises moving the product radially outward from a center position by centrifugal force, rotating it during such radial movement and cutting it into pieces during such movements.

A specific object of the invention is to provide knives which are respectively operatively connected to the segments in a novel manner.

Other objects of the invention reside in the mode of operatively connecting the components of the various subassemblies of the machine, including its many advantages with respect to manufacture and assembly, accuracy and uniformity of the chips produced, low cost of maintenance and capacity for manufacturing enormous quantities of the chips.

Additional objects and advantages of the invention or inventions present in the machine will become apparent after the description hereinafter set forth is considered in conjunction with the drawings annexed hereto wherein a preferred embodiment of the machine is exemplified.

In the drawings:

FIGURE 1 is a top view of the complete machine;

FIGURE 2 is a perspective view of the machine with the cutter assembly and cover therefor removed and with the hopper disposed in an inoperative position;

FIGURE 3 is an enlarged vertical sectional view of the machine taken substantially on line 3—3 of FIGURE 1 illustrating details of the power unit, driving mechanism and the operative relationship of the carriage with the driving mechanism;

FIGURE 4 is an enlarged partial elevational view of means employed to detain the hopper in different predetermined rotative positions with respect to the carriage;

FIGURE 5 is a further enlarged top view showing the operative relationship of the carriage and cutter assembly, with portions in section and portions of the structure removed to illustrate certain details thereof;

FIGURE 6 is a partial vertical section of the structure depicted in FIGURE 5, with portions removed in order to illustrate other details of the construction;

FIGURE 7 is an end view of a cam used in connection with the structure of FIGURE 8;

FIGURE 8 is an enlarged partial vertical sectional view of one of several identical roller means which are utilized to provide an operative driving connection between components of the carriage;

FIGURE 9 is a pictorial view of the cutter assembly;

FIGURE 10 is a perspective view of a clamp;

FIGURE 11 is a perspective view of a knife;

FIGURE 12 is a perspective view of a holder for the knife and clamp;

FIGURE 13 is a partial transverse section showing the manner in which the components of FIGURES 10 through 12 are operatively connected;

FIGURE 14 is a transverse section taken substantially on line 14—14 of FIGURE 12;

FIGURE 15 is a transverse section taken substantially on line 15—15 of FIGURE 11;

FIGURE 16 is a partial horizontal sectional view of the cutter assembly exemplifying the relationship of the segments with respect to one another and the center of the assembly;

FIGURE 17 is an enlarged partial horizontal section of portions of the segments and a portion of the carriage showing a product in the act of being cut into a slice or chip of the lattice type;

FIGURE 18 is a perspective view of a portion of the chip produced by the machine;

FIGURE 19 is an enlarged elevational view of a portion of the chip depicting its structural characteristics;

FIGURES 20 and 21 are enlarged elevational views of portions of chips provided with corrugations of different widths which are somewhat greater than those depicted in FIGURE 19; and FIGURE 22 is an enlarged elevational view of a portion of a chip which has been constructed without openings therein.

Referring briefly to the main components or subassemblies of the machine illustrated in FIGURES 1, 2 and 3 of the drawings, numeral 1 generally designates a substantial frame having a base 2 which supports a power unit 3; 4 a stationary cutter assembly supported from the frame; 5 a rotatable carriage or conveyor assembly is disposed in the cutter assembly for feeding the product to the cutter assembly; 6 means operatively connecting the power unit with the carriage; 7 a hopper pivotally mounted above the carriage for delivering the product to be cut into the carriage; 8 a guide or discharge ring disposed about the cutter assembly; and 9 a funnel for directing the cut product into a container adapted for disposition therebelow.

The machine may be mounted where desired, depending on its use, but it is preferably utilized to cut potatoes into slices or strips of the lattice or corrugated type and is adapted to be firmly mounted on a suitable superstructure over a tank containing water or other solution, constituting a component of a system, such as a system for frying the potatoes. A bucket elevator or other suitable conveyor, in combination with a chute at the delivery end of the conveyor, is preferably employed to feed the product into the hopper 7 above referred to. A pipe is preferably located above the machine for continuously delivering a small stream of water into the carriage in order to free the carriage and cutter assembly from any accumulation of starch and promote the flow of the product therethrough. The tank and superstructure therefor, bucket and chute, and the water pipe are not illustrated as they are of a conventional character. The organization thus offers a setup whereby the product may be continuously fed through the cutter assembly of the machine so that the portions or segments cut from the product will fall into the tank.

The frame, generally designated 1, may be designed and constructed in various ways, but as exemplified herein, it includes the base 2, above referred to, a platform 10 supported above the base by a plurality of corner legs 11 and reenforcing members to provide a stable rectangular frame structure. The base is preferably provided with apertured lugs 12 through which fastening means may be extended for anchoring the machine in place. A substantially U-shaped member 13 extends laterally in a horizontal plane from one side of the frame and, among other things, serves to support the guide 8 and the funnel 9.

The power unit 3 is preferably in the form of an electric motor mounted on the base 2 and the means generally designated 6 for operatively connecting this unit and the rotatable carriage 5 may be constructed as desired but as exemplified, particularly in FIGURE 3, includes a horizontal shaft 14 extending laterally from the frame and a vertical shaft 15 geared to the horizontal shaft. The inner end of the horizontal shaft is provided with a relatively large pulley 16 having a belt thereon which is driven from a smaller pulley (not shown) carried by the motor shaft. The outer end of the horizontal shaft is provided with a small spiral bevel gear 17 which meshes with a larger bevel gear 18 keyed to the lower end of the vertical shaft. The upper end of the vertical shaft is provided with an annular head 19 on which the carriage 5 is detachably secured.

As depicted in FIGURE 3, the horizontal shaft is substantially journalled in a cylindrical casing or housing 20 and the vertical shaft in a housing 21 attached to the casing. The casing 20 is carried by a mounting plate 22 which in turn is connected to an upper horizontal bar 23 and a lower horizontal bar 24, the latter being anchored to one side of the frame of the machine. The bars are constructed from strong metal stock and the plate 22, which is relatively thick, is detachably supported by bolts 25 within the confines of the frame against the inner sides of the bars. The casing is provided with a reduced inner end portion 26 which is firmly secured in a central opening provided in the plate by screws 27 which extend through the plate and engage threaded apertures provided therefor in a radially extending annular flange 28 formed on the casing at the base of its reduced portion. It is to be noted that the inner side of this flange and the inner side of a shoulder formed by the reduced portion provide a relatively large bearing surface which engages the outer side of the mounting plate and that the thickness of the plate and the cross-sectional dimension and length of the reduced portion of the casing contribute to firmly anchor the casing on the frame. A spacer member 29 may be interposed between the upper bar 23 and the plate to assist in accurately positioning the connecting means 6 so that the head 19 on the vertical shaft is level for properly supporting the carriage.

The reduced portion 26 of the casing preferably extends inwardly beyond the mounting plate 22 and is engaged by the hub of the pulley 16 for spacing the pulley a predetermined distance away from the plate for clearance purposes. The pulley is preferably detachably secured to the horizontal shaft 14 by a set screw which extends through the hub of the pulley. A suitable roller bearing assembly 30 and an oil seal 31 are disposed in the reduced portion 26 of the casing 20 for supporting the inner extremity of the horizontal shaft. The outer end of the casing is formed with a thick end wall having an opening therein within which is seated a roller bearing assembly 32 for supporting the outer extremity of the shaft. An end thrust ball bearing assembly 33 for the horizontal shaft is interposed between the small gear 17 and the thick end wall of the casing 20. The gear 17 is secured to a reduced end of the horizontal shaft in a conventional manner.

The thick end wall of the casing 20 is also formed with a radial extending annular flange 34 through which screws 35 extend into threaded apertures provided in a vertical planar wall 36 of the housing 21 for detachably connecting together the casing and housing. The vertical wall is also provided with a clearance opening for the horizontal shaft and the ball bearing assembly 33. The housing is preferably constructed in the form of a cup and includes a top wall 37 having a clearance opening therein through which a cylindrical tubular member 38 depends. This tubular member is provided with an annular flange 39 which is detachably secured upon the top wall 37 of the housing by a plurality of screws 40, only one of which screws is shown in FIGURE 3, with its head disposed within the confines of the flange. The lower end of the tubular member 38 is preferably counter-bored and receives a tapered roller bearing assembly 41 for journalling the lower extremity of the vertical shaft 15 and the upper end of the tubular member is similarly counter-bored and receives a tapered roller bearing assembly 42 for the upper extremity of the shaft. An oil seal 43 is also heated in the aforesaid counter-bore. The casings or housing 20 and 21 are sealed and adapted to contain oil for lubricating the movable components therein and the housing 21 is provided with a suitable refill opening and a discharge opening (not shown).

It will be noted that the underside of the head 19 of the vertical shaft is provided with an annular groove 44 which receives the upper end of the tubular member 38 so that a lip or skirt of the head extends downwardly in embracing relationship with the upper end in order to prevent accidental entry of pieces of the cut product and/or juice therefrom into the member.

The carriage or conveyor assembly generally designated 5 may be designed and constructed in various ways but as exemplified in FIGURES 2, 3, 5 and 6 primarily comprises a receptacle 45 and four identical tubular guides 46. The receptacle is preferably square shaped and includes a base wall 47 constituting a receiving platform and four vertical side walls 48. The base wall is detachably secured against the annular head 19 by screws 49 which extend through holes provided therefor in the wall for connection with the head. The heads are flush with the upper planar surface of the base wall and a pin 50 carried by the head extends upwardly into a center hole in the base wall for locating purposes. The receptacle is open at its top for receiving the product from the hopper or by other means of introduction and each of its side walls is provided with a relatively large circular opening 51. The axes of these openings extend radially and perpendicular to the vertical or longitudinal axis of the carriage and are spaced apart circumferentially ninety degrees.

The tubular guides 46 of the carriage, as alluded to above, are respectively journalled or rotatably mounted on the side walls of the receptacle in a unique manner. More particularly in this regard, each of the guides is preferably cylindrical in form and provided with an annular V-shaped exterior groove 52 adjacent its inner end to form a track or raceway for receiving preferably three identical roller assemblies which are detachably secured in an equally spaced relationship to each side wall of the receptacle so that the longitudinal axes of the guides are respectively radially disposed in axial alignment with the axes of the openings 51 in the side walls. Attention is directed to the fact that the inner ends of the guides are disposed in close juxtaposed positions in relation to the side walls of the receptacle in order that the product will freely pass without interruption into the guides which serve as cylindrical passageways between the receptacle and the cutter assembly. It will be noted that the inner ends of the pasageways are preferably counter-bored as indicated at 53 in order to assist in piloting the product into the passageways and that the outer ends of the guides are preferably bevelled at 54 to provide clearance so that they can be located in close proximity to the segments of the cutter assembly as best shown in FIGURES 5 and 6. Each of the guides is preferably provided with circumferentially spaced longitudinal extending ridges 55 or abutments which extend into the passageways so as to assist in rolling or rotating the product while it travels through the passageways.

Referring again to the roller assemblies, it will be evident by viewing FIGURES 6, 7 and 8 that each roller assembly preferably includes a ball bearing unit, an annular rim or member 56 carried by the bearing unit, a cam 57, and a screw 58 having an Allen head engaging the cam and a shaft extending through an eccentrically located hole 59 in the cam, the unit and a spacer 60 into the side wall of the receptacle. The cam includes a cylindrical portion 61 which extends through the bearing unit and engages its inner race 62 and is of a length substantially corresponding to the axial length of the unit. The member 56 of each roller assembly is preferably press fitted or otherwise fixed on an outer race 63 of the bearing unit and provided with a pair of converging surfaces which engage the track 52. Each of the spacers 60 is interposed between the inner end of the cam and the side wall of the receptacle. The cam also includes a head which is preferably provided with a pair of notches 64 as shown in FIGURE 7. The arrangement is such that when a screw is loosened, a spanner wrench may be brought into engagement with the notches 64 to turn the cam about the axis of the screw to move the bearing unit and annular member 56 toward or away from the longitudinal axis of the circular opening 51. In this way, the guides can be accurately mounted and subsequently adjusted for wear.

The means utilized to rotate the guides about their respective axes is unique and will now be described. Each of the guides is preferably provided with a relatively large radial annular flange 65 having an annular offset portion 66 disposed at an oblique angle to the radial flange. The peripheral edge of each offset portion is provided with teeth or serrations 67 which are arranged at a predetermined angle and bear against a resilient ring 68 seated in an annular groove 69 provided in a stationary plate 70. This plate is preferably detachably secured against a mounting 71 by a plurality of screws 72 which extend through the plate and support into the radial flange 39 of the tubular member 38 as shown in FIGURES 3 and 6. The toothed flanges may be referred to as gears. The resilient ring bears against the teeth on all four guides in a manner whereby when the carriage is rotated about its vertical axis, in a clockwise direction as indicated by the arrow in FIGURE 5, the guides will be caused to simultaneously rotate about their respective longitudinal axes. In other words, the guides rotate about the vertical axis of the the carriage as well as about their own axes so that the product after being deposited in the receptacle will automatically find its way out through the guides as a result of centrifugal force and be caused to rotate while being carried by the guides. It will be noted that the radial flanges 65 are each provided with three equal spaced round openings 73 of a size sufficient to permit insertion of a tool therethrough for connection with any one of the Allen head screws or a wrench for engaging the notches in the cam in order to facilitate adjustment of the rollers supporting the guides. Such adjustments can be readily made after the guide ring 8 and cutter assembly are removed. These adjustments also afford a setup whereby the teeth on the flanges of the guides can be brought into proper compressive operative engagement with the resilient ring 68. If found desirable, provision can be made for adjusting the plate 70 to vary the pressure between the resilient ring and the teeth or gears on the guides.

The cutter assembly generally designated 4 and its relation to the mounting 71, carriage and other associated components will now be described. The cutter assembly, as illustrated in FIGURES 3, 5 and 9, preferably comprises four corresponding curved elongate segments 74, 75, 76 and 77, each of which is secured against the underside of an annular support 78 by a pair of screws 79 and 80. Each of the segments is provided with an inner spheroidal surface 81 of appreciable circumferential extent or area, an upper horizintal outer flange 82 having an end portion 83, a lower horizontal outer flange 84 having an end portion 85, and a pair of vertical ribs 86 and 87 located adjacent its ends and joining the flanges 82 and 84. A curved corrugated knife 88 is carried by that end of each segment having the rib 87 and end portions 83 and 85 thereon and the opposite end of each segment terminates in a vertical edge portion 89. The flanges and ribs, among other things, serve to reenforce each segment. The screws 79 extend through the support and engage threaded apertures provided therefor in the upper flanges 82 and pins 90 carried by the lower flanges 84 are aligned with these screws and extend into holes 91 provided in a rim 92 of the mounting 71 to pivotally connect the knife carried end of each segment to the support and mounting. The screws 80 are carried by the upper flanges and extend through slots 93 in the support for selectively locking the segments after they have been adjusted for gauging the thickness of the slices to be cut. The segments are thus assembled with the support in a circular arrangement and held in relation to the mounting 71 by the pins. The cutter assembly may thus be readily placed on the mounting with the pins registering in the holes or be lifted therefrom. This factor is important from the standpoint of repair and cleaning as well as replacement or substitution of a cutter assembly for cutting a different type of slice, since the machine is designed to accommodate the particular cutter assembly shown and other cutter assemblies.

The mounting 71 for the cutter assembly is detachably connected to the housing 21 through the tubular member 38 by the screws 72 and is preferably of a dished spider-like character so that any juice, small cut or mashed portions of the product which may get in between the receptacle and guides and between the guides and cutter assembly will flow or fall downwardly through openings 94 in the mounting into a tank therebelow. The rim 92 of the mounting is provided with a crest portion defined by a pair of inclined or sloping surfaces which serve to substantially prevent accumulation of any of the product between the mounting and cutter assembly because it is important that this assembly rest firmly on the mounting in a true concentric and horizontal position about the carriage.

The mode of attaching the knives to the segments will now be described. The inner side of the vertical edge portion of each segment including the rib 87 is rabbetted as indicated at 95. An elongated curved spheroidally shaped knife holder generally designated 96 has a base portion 97 secured in each rabbet by a pair of screws 98 which extend through holes in the end portions 83 and 85 of the flanges and engage threaded holes 99 provided therefor in the base portion as shown in FIGURES 9, 12 and 13. The inner side of each holder is provided with a spheroidal surface 100 which constitutes a continuation of the spheroidal surface 81 of each segment. The base portion of each holder is provided with a pair of longitudinally spaced threaded apertures 101 which receive screws 102. The base portion is also provided with a bevel 103 to form a seat for a clamp 104 which is secured to the holder by the screws 102. Each holder further includes a laterally extending or offset corrugated portion 105 and an adjacent shoulder 106. Attention is directed to the fact that the base portions of the corrugations are spheroidal and constitute continuations of the surface 100 and that the crest portions of the corrugations are curved.

Each of the clamps 104 is elongate and includes an attaching portion 107 provided with apertures 108 and an offset corrugated portion 109 which bears on the bevel 103. The screws 102 extend through the apertures 108 in the attaching portion of each clamp and engage the threaded apertures 101 in each holder, and when properly tightened serve to firmly clamp a knife between the corrugated portion 105 of the holder and corrugated portion 109 of the clamp and against the shoulder 106 to locate the cutting edge of the knife in a predetermined extended inturned position beyond the lateral corrugated portion of the holder as evidenced in FIGURES 13 and 17. It will be noted that the longitudinal marginal edge of each clamp engages a rib 87 to assist in stabilizing the position of the clamp. Attention is directed to the fact that the knives are inexpensive and can be discarded and that the holders and clamps are preferably coated with Teflon as indicated at 110 in FIGURES 10 and 12 so that the slices will readily slide off these components. The corrugations of the knives nest or mate with the corrugated portions of the holder and clamp and the cutting edge of each knife is preferably defined by a short inner bevel 111 and a long outer bevel 112.

Referring to the operative relationship of the segments and components associated therewith as exemplified in FIGURES 16 and 17 of the drawing, the cutting edges of the knives on the segments are all located the same radial distance R1 from a center point X1 constituting the center or longitudinal axis of the cutter assembly. The terminal edge portions 89 of the segments are also all located the same radial distances to the center point X1 but at a greater distance than the radial distances R1 due to the fact that the segments have been adjusted in a horizontal plane to provide a discharge passage or a space between the terminal portion 89 of each segment and a knife carried by an adjacent segment. In other words, the segments have been adjusted so that, for example, the radial distance R2 from a center X2 to the spheroidal surface 81 of the segment 76 and spheroidal surface 100 on the adjacent holder is the same as the radial distance R3 to a center X3 to the spheroidal surface 81 of the segment 77. The centers X2 and X3 and the other centers for the radial distances to the spheroidal surfaces of the other segments 74 and 75 are equally spaced concentrically about the common center or axis X1.

The procedure of cutting a product such as a single potato 113 exemplified in FIGURE 17 will now be described. When the motor 3 is energized the carriage will rotate about its longitudinal axis and the tubular guides about their respective longitudinal axes, so that when the potato is fed to the receptacle of the carriage by the hopper 7 or by any other suitable means, the centrifugal force, resulting from rotation of the carriage, will automatically cause it to travel or find its way radially outward through one of the openings in the receptacle into the adjacent tubular guide which rolls or rotates it while it is being carried or directed to the stationary cutter assembly. Thus, the potato is rotated about the longitudinal axis of the carriage and about its own axis as it travels through the guides into successive engagement with the spheroidal surfaces and knives of the cutter assembly.

The potato 113 is shown as having had several slices or chips removed. The knife 88 in FIGURE 17 is shown cutting into the potato to form a portion 114 which when severed will constitute a slice or chip having the structural characteristics exemplified in FIGURES 18 and 19, with curved corrugations 115 on one side and curved corrugations 116 on its opposite side which are disposed transverse to the corrugations 115. More specifically in this respect, the corrugations 115 have been formed by the knife on the segment 75 and as the potato rotatably slides on the spheroidal surface 81 of the segment 75, the knife on the adjacent segment 76 cuts the potato to simultaneously form the corrugations 116 on the portion 114 and corrugations 117 on the outer side of the potato as indicated by the dotted lines. The potato is shown being cut while it is rotatably sliding on the spheroidal surface 81 of the segment 75 as well as on the spheroidal surface 100 of the knife holder on the segment 76 and spheroidal surface of the latter. The potato upon leaving the segment 75 rotatably slides throughout the full circumferential extent of the spheroidal surface of the segment 76 into engagement with the knife on the segment 77 and so if a sufficient portion of the potato is left it may again be severed by the knife on the segment 76. In other words, one knife may cut one or several slices or chips from one potato or any other product capable of being cut by the machine.

Attention is also directed to the fact that the potato will be caused to revolve at a different number and also a higher number of revolutions per minute than the tubular guide or feed tube. There are a number of factors which encourage this action. The friction of the potato against the spheroidal gauging surface will cause the potato to lay back tightly against the inside surface of the guide and the centrifugal force on the potato will cause it to remain at the largest radii of the spheroidal surface which will be toward the trailing inside surface of the guide. The ridges or abutments 53 serve to impart rotation to the potato about its axis while it is lying tightly against the surface of the guide. The potato is thus continuously rotated about two different axes while it is successively subjected to the knives.

Of further significance is the fact that the spheroidal gauging or bearing surfaces offer a unique setup whereby centrifugal force can be advantageously employed and yet permit the potato to rotate and continue to maintain contact against such surfaces while the carriage is rotated.

The above described operation takes place when only one potato or possibly a row of two or three relatively small potatoes are rotated against the trailing inside surface of a guide or tube. However, if the machine is operated at maximum capacity, several potatoes may simultaneously find their way through each guide in such a way that each potato will assist in holding one or more other potatoes in position about the longitudinal axis of the tube so that as the slicing acting occurs the entire mass of potatoes will rotate with the guide about is longitudinal axis and slide radially outwardly. Thus, several potatoes in each guide may be simultaneously subjected to one knife and then to the next knife and so on. The slices or chips are substantially concavo-convex in shape and of uniform thickness as they are discharged from the cutter assembly.

The use of the term corrugations is intended to include various form or types of cross-sectional configurations. For example, the corrugations 115 and 116 shown in FIGURES 17, 18 and 19, are in the form of spaced corresponding curved formations or ridges, each ridge being defined by a pair of inclined surfaces 118 which are preferably disposed at an oblique angle of approximately forty degrees (40°) which merge into a crest portion 119. The opposed inclined surfaces also define a curved groove or channel so that each side of the slice is provided with ridges and grooves to form the corrugations.

When the segments of the cutter assembly are adjusted to obtain the thickness of the slice shown in FIGURES 17, 18 and 19, the knives will cut to a predetermined depth so that the grooves will be caused to intersect and provide a multiplicty of openings 120 extending through the chip as best shown in FIGURE 18. The transverse arrangement of the corrugations serves to improve the appearance of the chip, impart strength or rigidity thereto as well as enhance uniformity in the color when fried.

As exemplified in FIGURES 20 and 21 the knives can be constructed to produce corrugations such as 121 and 122 of different widths or sizes somewhat greater than those shown in FIGURES 17, 18 and 19. Each of the corrugations 121 includes an angle of approximately ninety degrees (90°) and each of the corrugations 122 an angle of approximately one hundred ten degrees (110°). The segments can also be adjusted to vary the size of the openings in the chips. For example, they can be adjusted to obtain thick slices with smaller openings or thin slices with larger openings. The friability of the chips may be modified by varying the size of the corrugations and/or the size of the openings. Moreover, if so desired, the segments can be readily adjusted so that the slices are devoid of openings as depicted in FIGURE 22. In other words, the portion of the slice shown in FIGURE 22 is provided only with corrugations, the size or shape of which can be varied depending on the shape or character of the knives and components associated therewith.

Any suitable means may be employed to guide the product to be cut into the carriage 5, but as illustrated in FIGURES 1, 2 and 3, the hopper 7, utilized for this purpose, comprises an elongated housing or shell having a generally square shaped extremity and a vertical tubular extremity. More particularly, the squared extremity includes a vertical planar end wall 123 and side walls 124. The end wall is provided with an inclined upper portion or lip 125 and the side walls with similar inclined portions 126, which portions serve in reenforcing the hopper and assist in directing the product into same. As shown in FIGURE 3, the side walls 124 are generally trapezoidal in shape and have lower inclined edges provided with depending flanges 127. The hopper adjacent the junction between its extremities is provided with an intermediate inclined wall having a depending flange 128 which is similar to the flanges 127. These flnages and a depending flange (not shown) on the end wall 123 define an inclined discharge opening 129 and above this opening there is provided an inclined grate structure preferably comprised of a plurality of corresponding cylindrical rods 130 arranged in a parallel relationship on a pair of cross members 131 connected to the side walls of the hopper. The spacing between the rods is predetermined so that when the product is droped into the hopper against the grate the product will slide downwardly into the vertical extremity of the hopper, while allowing any foreign material, such as stones, pebbles and the like, which have not been previously removed, to fall through the grate and discharge opening. A suitable container, such as a drawer (not shown), which is presently employed, is slidably mounted on the hopper under the grate for receiving such foreign matter.

The generally tubular extremity of the hopper includes a depending cylindrical portion 132 and the side walls of the hopper are joined or merged with the portion 132 by a curved wall 133. The tubular and squared extremities of the hopper are preferably reenforced to impart stability to the structure by utilizing a hollow member, which includes a top wall 134, a bottom wall (not shown) and a side wall 135, which walls are joined to the end wall 123 of the squared extremity, an adjacent side wall thereof, the cylindrical portion 132 and the curved wall 133. The hopper is also provided with an inclined wall 136 which generally constitutes a continuation of the grate so that the product will ride onto this wall after leaving the grate. Attention is directed to the important fact that the tubular and squared extremities of the hopper are offset with respect to one another and that the curved wall 133 is relatively large and includes a portion 137 adjacent the inclined wall 136 and cylindrical portion 132 so that as the product rides on the wall 136, the curved wall and adjacent portion of the cylindrical portion will direct the product in a curved path substantially tangent to the portion 132 into a funnel 132' carried thereby.

The hopper is preferably provided with a handle or brace 138 bridging the upper portion of its side walls for swinging the hopper in a horizontal plane to the full line operative position shown in FIGURES 1 and 3 with the cylindrical portion 132 vertically aligned with the carriage and cutter assemblies or to an inoperative position at one side thereof as depicted by the dotted lines in FIGURE 1 and the full lines in FIGURE 2. It will be noted that the funnel 132' carried by the cylindrical portion 132 is provided with an opening adapted for disposition above the receptacle of the carriage for directing the product into the receptacle.

The hopper may be supported for movement in any one of several ways, but as shown in FIGURE 3, it is mounted on a vertical post or pillar 139. The upper extremity of the post is secured in a suitable manner, such as by welding, in one corner of the squared extremity of the hopper and the lower extremity of the post is journalled in a cylindrical socket 140 having a base flange 141, through which screws 142 extend into a mounting plate fixed on the frame. The upper end of the socket is provided with a boss 143 and a fitting 144 is detachably secured thereto by screws 145 so that a rounded nose or detent portion 146 of the fitting extends upwardly above the socket for selective engagement with concave seats 147 and 148 provided on a circumferential portion of a collar 149 detachably secured to the post as evidenced in FIGURE 3A. When the nose 146 registers with the seat 147 the hopper is held in an inoperative position and when disposed in the seat 148 the hopper will be held in the operative position.

As noted above, a relatively large generally U-shaped member 13 projects laterally from the frame 1 and supports the guide 8 and the funnel 9. More specifically in this regard, the upper edge of the funnel is reenforced by a ring 150 which bears against the upper edge of the member 13 and the guide 8 which is frusto-conical in shape has a radial flange 151 which rests upon the ring 150 and is detachably held thereon by a plurality of three circumferentially spaced lugs or fingers 152 on the guide which extend downwardly about the ring and curved portion of the member. The guide is thus held in a concentric relation about the carriage and cutter assembly. The upper end of the guide is preferably provided with an axial extending cylindrical flange 153 located about the upper extremity of the carriage and the funnel with a clearance opening 154 for the tubular casing 20. The funnel about the opening is reenforced with an arched member 155 welded thereto.

The slices or strips engage the guide or ring 8 as they are ejected from the cutter assembly and the funnel constituting a continuation of the guide assists in directing them into a tank as mentioned above. In order to assist in preventing the slices or strips from adhering to the guide and funnel the latter are preferably provided with dimples, as shown in FIGURE 3, which present a multitude of convex surfaces adapted for engagement by the slices or strips.

Having thus described our invention, it is obvious that various modifications may be made in the same without departing from the spirit of the invention, and, therefore, we do not wish to be understood as limiting ourselves to the exact forms, constructions, arrangements, and combinations of parts herein shown and described.

We claim:

1. In combination: a frame, a stationary assembly carried by the frame and provided with a plurality of circumferentially spaced knives, a carriage rotatably mounted in the assembly for receiving a product to be sliced, and a plurality of tubular guides rotatably mounted on the carriage for directing the product radially to the knives.

2. In combination: a stationary assembly provided with circumferentially spaced segments having knives thereon, means for selectively adjusting the segments in a predetermined plane, a receptacle rotatably mounted in the assembly for receiving a product to be sliced, and a plurality of tubular guides carried by the receptacle and extending radially therefrom for directing the product to the knives.

3. In combination: a frame, structure carried by the frame and extending laterally therefrom, a stationary assembly mounted on the structure and provided with circumferentially spaced knives, a carriage mounted on the structure in concentric relation with the stationary assembly for transmitting to the knives a product to be cut, a hopper swingably mounted on the frame for disposition above the carriage for feeding the product thereto, a support extending laterally from the frame, and an annular guide mounted on the support about the stationary assembly for directing the cut product in a predetermined direction.

4. A carriage assembly for conveying a product to be sliced, said assembly comprising a receptacle having a bottom wall and side walls provided with openings, a plurality of tubular guides, and means respectively rotatably supporting the guides in a circumferentially spaced relationship in radial alignment with said openings for directing the product radially from the receptacle as it is received from the receptacle through said openings.

5. In combination: a frame, a power unit carried by the frame, housing structure supported on the frame and a pair of interconnected shafts arranged in the structure with one shaft being operatively connected to the power unit, a carriage connected to the other shaft for rotation therewith and provided with external circumferentially spaced radially extending rotatable guides, a stationary cutter assembly mounted on the housing structure about the carriage and provided with circumferentially spaced knives for cutting a product rotatably conveyed thereto by the guides, a hopper for feeding the product to the carriage, means mounted about the cutter assembly for guiding the cut product, and a funnel constituting a continuation of said means disposed below the carriage and cutter assembly.

6. In combination: a frame, a member projecting laterally from the frame, a power unit carried by the frame, a vertical rotary shaft, a carriage mounted on the vertical shaft for rotation therewith, a horizontal shaft operatively connected to the vertical shaft, means operatively connecting the horizontal shaft with the power unit, a stationary cutter assembly mounted about the carriage and comprising a plurality of circumferentially spaced adjustable segments respectively provided with knives, a hopper disposed above the carriage for directing a product to be cut into the carriage so the latter will convey the product to the knives, a funnel resting on the projecting member and disposed below the carriage and cutter assembly, and a guide resting on said funnel and arranged about the cutter assembly for directing the cut product into the funnel.

7. A machine of the kind described comprising a plurality of elongate curved segmental members operatively associated with one another to provide an annular assembly, each of said members being provided with an inner spheroidal bearing surface of appreciable circumferential extent, an elongate curved knife carried by and disposed transversely of each member for cutting a product as it travels to each knife from an adjacent bearing surface, a receptacle rotatably mounted in the annular assembly for receiving the product to be cut, and a plurality of tubular guides rotatably mounted on the receptacle and extending radially therefrom for revolving the product while it is being conducted therethrough from the receptacle by centrifugal force and subjected to the knives as it travels on said surfaces.

8. A carriage assembly of the kind described comprising a structure adapted for rotation for receiving a product, and tubular guides mounted radially and externally on the receiving structure for rotating and guiding the product substantially radially therethrough.

9. A carriage for conducting a product to a cutter assembly, said carriage comprising a rotatable platform structure for receiving the product, and a plurality of tubular guides rotatably mounted and extending radially of the platform structure, the arrangement being such that when the platform structure and guides are rotated about their respective axes and the product is deposited on the platform structure it will be directed outwardly therefrom by centrifugal force and into and through the guides for rotation thereby.

10. An assembly of the kind described comprising a mounting, a receptacle having a base wall secured to said mounting, and also having a plurality of side walls, each of said side walls being provided with a radially extending opening, a tubular guide mounted for rotation in an axially extending position from each opening, and means for rotating the mounting and receptacle about one axis and the guides about their respective axes for rotating a product when travelling therethrough.

11. A carriage assembly of the kind described comprising a rotatable platform for initially receiving a product fed thereto, a plurality of tubular guides extending radially of the platform, and means for rotating the guides about their respective axes for rotating the product when it is directed outwardly through the guides from the platform when the latter is rotated.

12. An assembly of the kind described comprising a mounting structure, a shaft rotatably supported on the structure, annular means carried by the mounting structure and disposed concentrically about the axis of the shaft, a receptacle attached to the shaft for rotation therewith, guide means rotatably mounted on the receptacle for receiving a product introduced into the receptacle, and means carried by the guide means engaging said annular means in a manner whereby rotation of the shaft and receptacle causes rotation of the guide means.

13. The assembly defined in claim 12, including means affording relative adjustment between the annular means and guide means.

14. A machine of the kind described comprising an annular structure having an internal spheroidal surface and a knife adjacent the surface, a carriage disposed for rotation in the annular structure, radially extending guide means rotatably associated with the carriage, and means for simultaneously rotating the carriage and guide means so that a product when placed on the carriage will be caused to travel outwardly into the guide means which rotates the product while it slides on the spheroidal surface into the knife.

15. A carriage assembly of the kind described comprising a structure adapted for rotation for receiving a product, tubular guides rotatable on said structure and extending radially therefrom for rotating and guiding the product substantially radially therethrough, and means provided internally on said guides for promoting rotation of the product when passing through said guides.

16. In combination: supporting structure provided with a stationary gear, a carriage rotatably mounted above said gear for receiving a product, tubular guides journalled on said carriage and extending radially therefrom, a gear carried by each of said guides engaging said stationary gear, means whereby rotation of said carriage and guides about the longitudinal axis of the carriage will simultaneously rotate the guides about their longitudinal axes to rotate and guide the product radially from the carriage.

17. The combination defined in claim 16, including a stationary assembly substantially surrounding said carriage and guides and provided with circumferentially spaced knives disposed in close relation to said guides for cutting the product as it is rotated thereagainst by said carriage and said guides.

18. An assembly for cutting a product; said assembly comprising an annular support and a plurality of segments; each of said segments having an extremity with a detachable knife rigidly connected thereto, an opposite extremity, and an inner spheroidal curved surface between said extremities; means connecting said segments in relation to said support to locate said segments in a circumferentially spaced relationship to form a generally annular structure provided with openings respectively defined by said knives and adjacent opposite extremities of said segments whereby a product introduced thereto for travel against said curved surfaces will be cut into pieces by said knives and discharged outwardly through said openings; and means whereby to facilitate connection of said assembly in a stationary position with respect to a mounting.

19. An assembly for use with an elongate support of a type which is adjustable to a stationary position in circumferentially spaced relation to similar supports as a component of a generally annular non-rotatable cutter structure and said support has an inner spheroidally curved surface and a transverse recess at one end thereof, said assembly comprising: a holder adapted to be rigidly secured in said recess, said holder having an inner spheroidal curved surface adapted to constitute a continuation of said first-mentioned surface, said holder having a base portion and an extended beveled portion, a knife to be clamped against said beveled portion of said holder and having a cutting edge to be disposed beyond said beveled portion and in a predetermined relationship to said inner curved surface of said holder, and clamping means including a plate having a portion engageable with the base of said holder and an offset portion engageable with said knife.

20. A support for the purpose described comprising an elongated curved segment having a pair of spaced apart substantially parallel edge portions with an inner spheroidally curved surface between said edge portions for engaging a product to be cut, one of said edge portions being provided with an internal elongate transverse recess, an elongate holder rigidly secured in said recess and having an inner spheroidal surface constituting a fixed continuation of said first-mentioned surface, said holder also having an outer elongate seat, an elongate knife, and means including a pair of locking elements extending through said knife and into said holder for rigidly securing said knife in relation to said seat, and means on said segment whereby to facilitate its connection to a mounting.

21. An elongate curved segment constituting one of several adapted to be arranged in a circumferentially spaced relationship to form a generally cylindrical structure adapted to be mounted in a stationary position, said curved segment having an inner spheroidally curved surface and one end provided with a transverse recess, a holder rigidly secured in said recess and having an inner spheroidally curved surface constituting a continuation of said surface on said segment, said holder having a base portion and a beveled portion, a knife clamped against said beveled portion and having a cutting edge disposed therebyond in a predetermined relationship to said inner curved surface of said holder, clamping means including a plate having a portion engageable with the base of said holder and an offset portion engageable with said knife, and means whereby said segment can be adjusted with respect to a mounting.

22. An elongate support of the character described, said support having an inner spheroidally curved surface and an edge portion; a holder detachably secured in a fixed position to said edge portion and having an inner spheroidally curved surface constituting a fixed continuation of the curved surface of the support, means for clamping a bendable knife against an outer portion of the holder, said support holder and clamping means constituting a unit, and means on said support for connecting it to a mounting.

References Cited in the file of this patent

UNITED STATES PATENTS

| | | |
|---|---|---|
| 1,080,602 | Stokes | Dec. 9, 1913 |
| 1,594,996 | Brown | Aug. 3, 1926 |
| 1,951,804 | MacDougall | Mar. 20, 1934 |
| 1,965,501 | Knott | July 3, 1934 |
| 2,024,353 | Goodman | Dec. 17, 1935 |
| 2,612,453 | Stahmer | Sept. 30, 1952 |
| 2,767,752 | Stahmer | Oct. 23, 1956 |
| 2,769,714 | Stahmer | Nov. 6, 1956 |
| 2,832,387 | Woodward | Apr. 29, 1958 |
| 2,868,400 | Powischill | Jan. 13, 1959 |
| 2,923,337 | Joiun | Feb. 2, 1960 |

FOREIGN PATENTS

| | | |
|---|---|---|
| 781,627 | France | Feb. 25, 1935 |